2,858,205

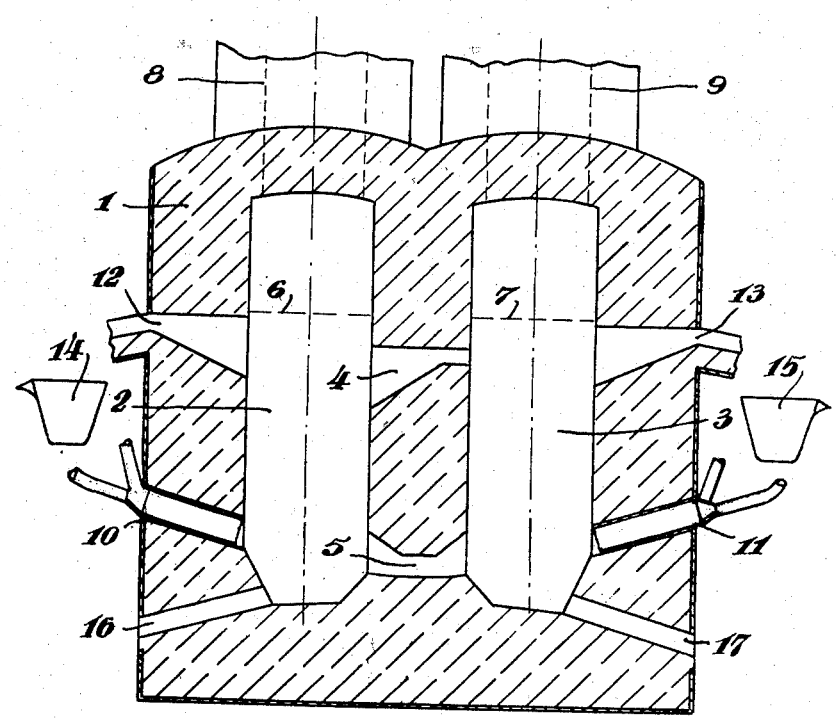

CONTINUOUS METHOD FOR REDUCING OXIDIC ZINC ORES INDIRECTLY BY MEANS OF CARBON AND APPARATUS FOR CARRYING OUT THE METHOD

Eugene Warland, Prayon-Trooz, Belgium, assignor to Panmetals and Processes Inc., Panama, Panama Application July 19, 1955, Serial No. 522,983

Claims priority, application France July 26, 1954

13 Claims. (Cl. 75—87)

This invention relates to methods and devices for reducing oxidic zinc ores.

It is known that when the reduction of oxidic zinc ores is effected with a blast of combustion supporting gas supplied in such a manner as to pass through a mixture of the ore and carbon, the result will be zinc vapour diluted by carbon monoxide and carbon dioxide and also by the nitrogen supplied along with the blast of combustion supporting gas. Such dilution in the presence of carbon dioxide makes the condensation of zinc vapours into liquid zinc a particularly difficult matter.

To obviate the above difficulties, it has previously been proposed to effect reduction by using a material or a mixture of materials other than carbon, and one that will give, in combination with oxygen, compounds which are not volatile at the temperature of the reduction reactions and, therefore, do not accompany the zinc vapour released. More particularly, quite valuable results have been secured by using iron or silicon, or an alloy or a mixture of the two elements in any percentage of either. The invention is based upon the fact that these elements can be regenerated from the slag made up of the molten mixture of their oxides and of the residues from the reduction of the ore by suitable treatment.

An object of the invention is to provide a continuous method for reducing oxidic zinc ores indirectly by means of carbon by effecting a reduction of the zinc oxide in one device within a molten slag bath, using a material other than carbon, and by performing the regeneration of the material by the carbon in a second device, within a molten slag bath. Such regeneration is effected by using as a starting material the slag resulting from the reduction of the oxidic zinc ore of the first device. Another object of the invention is to combine both steps in a simple and effective manner.

To this end, the invention provides for effecting the reduction and the regeneration in two distinct compartments or zones each containing a molten slag bath and connected to each other by one or more passages situated at the upper portion of the slag baths and by one or more passages situated at the lower portion of the baths. Due to this arrangement, slag containing the oxidation products of the materials used for reducing zinc flows through the upper passage or passages to the regeneration compartment, while slag including the regenerated reducing agent, and which is more dense, flows through the lower passage or passages to the reduction compartment. The specified flow is due to the difference in density between the slags from the two baths.

The oxidic zinc ore is introduced into the reduction compartment and the carbon is supplied to the regeneration compartment. Materials such as fluxes, or other materials that may be found useful or necessary with the view of improving the quality of the slag or promoting the reactions, may be supplied to the one and/or to the other of the compartments.

The gaseous products evolved are drawn off separately from the respective compartments.

Continuous or periodical discharge of a portion of the slag from the one and/or from the other of the two compartments is required in order to balance the introduction of residual material originating from the gangue of the ore and from the coal ash, as well as from the additions as specified above. Such slag carries with it metals, including copper and lead, that may not have been removed through tap-holes provided in both compartments, and also sulfur-containing mattes accruing from the zinc ore used, and which are formed in the one and/or in the other compartment.

The method according to the invention makes it possible to obtain, in the reducing compartment, zinc vapour at a relatively high concentration in a substantially non oxidizing gaseous medium, so that the condensation of the metal in liquid form may be effected with good efficiency, particularly in a surface condenser of known type.

In the regenerating compartment there is produced combustible gases the composition of which depends upon the working conditions, which gases may be employed for a great many of different uses.

Such gases as are obtained according to the invention form a valuable byproduct, considering that the composition thereof may be varied to a large extent by varying the working conditions; more particularly, such gases may contain very large amounts of hydrogen and carbon monoxide.

Further features and advantages of the invention will appear from the following disclosure of an example of the invention, with reference to the accompanying diagrammatical drawing, which is a sectional view of an apparatus suitable for performing the method of the invention. In the disclosure, reference will be made merely to the use of ferrosilicon as an intermediate reducing agent (for simplicity, the term "intermediate reducing agent" will be used to indicate material other than carbon, which is capable of effecting the reduction of the zinc oxide and of combining, by oxidation, with the combustion supporting gases, while evolving heat, and then to be regenerated by the carbon). The term "ferrosilicon" is used to indicate not only any mixtures and alloys including any percentage of iron and silicon, but also iron or silicon, or any other similar reducing agent.

In the drawing, 1 indicates the furnace as a whole, which includes a reducing compartment 2 and a regenerating compartment 3, said compartments being connected to each other by one or more lower passages 5 and one or more upper passages 4. The two compartments each contain a bath of molten slag having suspended therein the intermediate reducing agent, metals and mattes, the approximately levels of the baths being indicated at 6 and 7 respectively. Conduits 8 and 9, adapted for the withdrawal of the gaseous products, open into the crowns of the compartments 2 and 3, respectively.

In the apparatus illustrated, the oxidic zinc ore may be introduced into the slag by any means, particularly by forcing the ore in a pulverized state through tuyeres 10; likewise, the coal may be introduced into the slag bath 3 by any means, particularly by forcing the coal in a pulverized state through tuyeres 11. Materials such as fluxes, or other materials which may be useful or necessary for improving the quality of the slag or promoting the reactions, may be supplied to the one and/or the other compartment by any means, particularly by forcing them in a pulverized condition through the one and/or the other of the tuyeres 10, 11. The liquid ferrosilicon, which is present in suspension in the slag bath 2, burns partly, supplying the bath with the heat required for the endothermic reaction by which the zinc oxide is reduced by the ferrosilicon. The regeneration of the reducing agent in the compartment 3 may also be effected in accordance with the principle of the heat-self-generating process, viz.: a proportion of the carbon provides for the regeneration of the iron oxides and the silicon oxides contained in the slag, while the remainder of the coal burns while evolving the heat required for the reduction. In the compartment 3, that fraction of the slag which contains the ferrosilicon in the form of molten metal is more dense and tends to collect at the bottom. This fraction will therefore flow to the reducing compartment 2 through the passage 5, in accordance with the principle of communicating vessels, while upon oxidation of the iron and the silicon by the reduction of the zinc ore, the slag, which has now a poorer metal content and is therefore lighter in weight, will flow through the passage 4 to the compartment 3. It follows that the ferrosilicon is oxidized in the bath 2 to form slag and is regenerated in the bath 3 to form molten metal, by turns, while the flow of the ferrosilicon, which is accomplished in the apparatus in a continuous manner and in the alternate forms above described, is secured automatically.

The gangue of the ore, the ash from the coal and materials such as fluxes, or other materials which may be found useful or necessary with the view of improving the quality of the slag or promoting the reactions, are effective in introducing into the apparatus such items as will cause the formation of fresh slag. Therefore, provision is made to tap off slag either continuously or periodically. By suitably adjusting the withdrawal of a proportion of the slag from either compartment, or from both, through tap-holes such as 12 and 13, which have been provided to this end at suitable levels, it is possible to keep the quality and the composition of each type of slag practically constant.

Decanting vessels 14 and 15 catch the slag discharged from the furnace, thus providing for a density separation of the mattes (metal sulfides) and the metals likely to be carried with the slag.

Tap-holes such as 16 and 17, which are situated at the bottom portion of the compartment, provide for the withdrawal of such metals from the furnace as may settle at the bottom of the compartments.

The gas carrying the zinc vapour evolved in the compartment 2 is drawn off to the condenser through the duct 8.

The larger the amount of heat released in the reducing compartment and supplied thereto per unit of volume of the nitrogen blast the higher the zinc content of the said gas.

It follows that the factors that influence the content are mainly: the oxygen content of the combustion supporting gas, the temperature of the combustion supporting gas, the silicon content of the mixture of iron and silicon issuing from the regeneration compartment and, in the next place, the heat of the materials supplied to that compartment. In the most unfavorable instance, that is to say, when a cold air blast which is not oxygen-enriched is supplied and reduction is effected by iron free of silicon, the zinc vapour content of the gas is as high as about fifteen percent in volume; such content may be readily increased to about fifty percent by the action of the aforesaid favorable factors, thus doing away with all difficulties as far as condensation is concerned, which increase may be even much larger, if desired, e. g. ninety percent.

If the air blast supplied at 11 into the regenerating compartment is not enriched with oxygen, it is advisable to pre-heat the air blast to, say, about 600–800° C. The silicon content of the alloy produced in the said compartment will vary substantially as a direct function of the pre-heating temperature of the combustion supporting gas and of its oxygen content, the silicon content being particularly responsive to the carbon-oxygen ratio, which should accurately be made to suit the working conditions of the apparatus, in order to maintain a suitable temperature in the fused bath.

If the combustion supporting gas blown in at 11 is enriched with oxygen, the silicon content of the molten metal may be considerably increased, which results, as has been pointed out above, in a substantial increase of the concentration of zinc vapour in the gas produced in the reducing compartment.

The gas produced in the compartment 3 is composed mainly of carbon monoxide and nitrogen if air is used as the combustion supporting agent, the carbon monoxide content of such gas increasing if air enriched with oxygen is used. If desired, water vapour may be blown in along with the combustion supporting agent, which will result in the release of a gas of the water-gas type. Introducing water vapour and oxygen into the regenerating compartment makes it possible to obtain not only a ferrosilicon very rich in silicon, which will entail an increase in zinc concentration of the gas evolved in the reducing compartment, but also a high quality gas, delivered at 9 and which is suitable for various industrial uses, especially for synthesizing processes. Combustion of all or part of the gases that leave the regeneration compartment makes it possible to supply the heat necessary for pre-heating the combustion supporting gases delivered to the two compartments of the furnace. The gas drawn off at 9 still contains some zinc vapour released from the zinc oxide that has remained in solution in the slag and that undergoes reduction in the compartment 3; such vapour may be condensed in the form of metal dust or be collected as zinc oxide after the combustion of the gas.

Due to this invention, it may be possible, especially if coal is blown in by the tuyere, to use dust coal of low commercial value, and which will be transformed into rich gas heated up to a high temperature and, therefore, capable of commercial use.

It will be understood that the invention is not restricted to the example described and illustrated, which may undergo various modifications without departing from the spirit of the invention.

*Example*

By way of example, raw materials having approximately the following compositions may be used:

(1) Oxidic zinc ore containing:

| | Percent |
|---|---|
| Zn | 59 |
| Fe | 7 |
| $SiO_2$ | 3 |
| CaO | 0.5 |

(2) Coke with 16% of ashes comprising:

| | |
|---|---|
| $SiO_2$ | 60 |
| FeO | 4 |
| CaO | 8 |
| $Al_2O_3$ | 28 |

The materials, as well as the blasts of gases, are being introduced in cold condition into the apparatus. A daily output of 100 tons of zinc can be obtained by operating as follows:

7.1 tons per hour of zinc ore, 500 cubic meters per hour of air and 500 cubic meters per hour of oxygen are introduced into the reducing compartment 2, from which will issue 1800 cubic meters per hour of gases containing approximately 78% of zinc vapour and 22% of nitrogen by volume.

10.4 tons per hour of coke, 5700 cubic meters per hour of air and 5700 cubic meters per hour of oxygen are introduced into the regenerating compartment 3, from which will issue 21,000 cubic meters per hour of gases containing approximately 78% of carbon monoxide and 22% of nitrogen by volume.

Furthermore, about 2.6 tons per hour of molten slag are tapped off, having a composition approximately as follows:

| | Percent |
|---|---|
| FeO | 28 |
| SiO$_2$ | 47.5 |
| CaO | 6.5 |
| Al$_2$O$_3$ | 18 |

I claim:

1. In a continuous process for reducing oxidic zinc ores indirectly by means of carbon, by effecting the reduction of the zinc oxide by an intermediate reducing agent comprising a material other than carbon and one which is capable of reducing the zinc oxide and combining simultaneously in an exothermic manner with combustion supporting gases supplied to the process, said method including regeneration of the intermediate reducing agent used in the process, the steps comprising effecting the reduction of the ore and the evolution of the quantities of heat required for such reduction by means of the intermediate reducing agent in one zone, performing the regeneration of the intermediate reducing agent by means of carbon in another zone, both zones containing each a fused bath of slag and metals in suspension and being in communication with each other through at least one passage situated at the upper portions of the slag baths and through at least one passage situated at the lower portions of the said baths, creating a flow through the upper passage to the regenerating zone of the slag containing oxidation products of the intermediate reducing agent and the residues from the reduction of the ore and a flow through the lower passage to the reducing zone of the slag which contains the regenerated intermediate reducing agent by means of a higher density of the intermediate reducing agent in the regeneration zone.

2. In a method as claimed in claim 1, using as the intermediate reducing agent a material selected from a group including any mixture of iron and silicon, any alloy of iron and silicon, iron, and silicon.

3. In a method as claimed in claim 1, delivering ore to the reducing zone and at the same time introducing combustion supporting gas into the bath in order to secure the combustion of a proportion of the intermediate reducing agent, so as to produce the heat necessary for the reducing reaction and introducing into the slag bath of the regeneration compartment, at the same time as carbon, combustion supporting gas in order to secure the combustion of part of the carbon, so as to supply the heat necessary for reducing the oxidized intermediate reducing agent by the carbon.

4. In a method as claimed in claim 1, introducing the carbon, in the form of coal, into the slag bath of the regenerating zone and at the same time introducing combustion supporting gas into the said bath in order to secure the combustion of part of the coal, so as to supply the heat necessary for reducing the intermediate reducing agent by the carbon.

5. In a method as claimed in claim 1, introducing combustion supporting gas separately in the slag baths of said zones, so as to evolve zinc vapour containing non oxidising gases in the reduction zone and combustible gases in the regeneration zone, and drawing off separately the gases evolved in each of said zones.

6. An apparatus for carrying out a method of reducing oxidic zinc comprising a reducing compartment adapted to contain a fused bath of slag; a regenerating compartment adapted to contain a fused bath of slag; at least one passage provided between the said two compartments and situated in the upper portions of the baths; at least one passage provided between the said two compartments and situated at the lower portions of the baths; means for introducing ore into the first compartment; means for introducing carbon into the said second compartment, tuyeres opening into the slag bath of at least one of said compartments for supplying a blast of combustion supporting gas thereto; and means for withdrawing separately the gaseous products evolved in each of the said compartments.

7. An apparatus as claimed in claim 6, including tuyeres opening into the slag bath of the reduction compartment and means for supplying ore in a pulverised state through said tuyeres.

8. An apparatus as claimed in claim 6, including tuyeres opening into the slag bath of the regeneration compartment and means for supplying carbon in a pulverised state through said tuyeres.

9. An apparatus as claimed in claim 6, including means for introducing in at least one of said compartments materials selected from a group including fluxes, materials for improving the quality of the slag and materials for promoting the reactions.

10. An apparatus as claimed in claim 6, including withdrawal means arranged at the top portions of at least one of the slag baths for drawing off part of the slag from the corresponding bath.

11. An apparatus as claimed in claim 6, including tapholes for discharging metals settled on the bottom of each compartment.

12. A method as claimed in claim 1, in which at least one of the materials supplied to the said zones is introduced by forcing it in pulverised form through tuyeres into the corresponding slag bath.

13. In a method as claimed in claim 2, using in the reducing zone a combustion supporting gas selected from the group consisting of air, air enriched with oxygen, and pure oxygen; and in the regenerating zone a combustion supporting gas selected from the group consisting of air, air enriched with oxygen, pure oxygen, and any one of such gases having water vapor admixed thereto.

References Cited in the file of this patent

FOREIGN PATENTS 456,806    Germany   ------------ Mar. 2, 1928